(12) United States Patent
Yoshida

(10) Patent No.: US 12,272,498 B2
(45) Date of Patent: Apr. 8, 2025

(54) MULTILAYER CERAMIC CAPACITOR

(71) Applicant: Murata Manufacturing Co., Ltd., Nagaokakyo (JP)

(72) Inventor: Hiroyasu Yoshida, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 10 days.

(21) Appl. No.: 17/503,416

(22) Filed: Oct. 18, 2021

(65) Prior Publication Data

US 2022/0139631 A1 May 5, 2022

(30) Foreign Application Priority Data

Nov. 2, 2020 (JP) .................................. 2020-183729

(51) Int. Cl.
| | |
|---|---|
| *H01G 4/30* | (2006.01) |
| *H01G 4/012* | (2006.01) |
| *H01G 4/12* | (2006.01) |
| *H01G 4/232* | (2006.01) |

(52) U.S. Cl.
CPC .............. *H01G 4/30* (2013.01); *H01G 4/012* (2013.01); *H01G 4/12* (2013.01); *H01G 4/232* (2013.01)

(58) Field of Classification Search
None
See application file for complete search history.

(56) References Cited

U.S. PATENT DOCUMENTS

| | | | | |
|---|---|---|---|---|
| 6,292,353 | B1* | 9/2001 | Haratani ................ | H01G 4/232 |
| | | | | 428/209 |
| 10,361,034 | B2* | 7/2019 | Tanaka .................. | H01G 4/232 |
| 10,950,387 | B2* | 3/2021 | Yeon ...................... | H01G 4/228 |
| 2012/0073129 | A1 | 3/2012 | Abe et al. | |
| 2012/0250221 | A1* | 10/2012 | Yamashita ............. | H01G 4/228 |
| | | | | 361/321.2 |
| 2014/0301013 | A1* | 10/2014 | Kim ........................ | H01G 4/01 |
| | | | | 29/25.03 |
| 2015/0077066 | A1* | 3/2015 | Stuart ..................... | H01G 4/30 |
| | | | | 361/301.4 |
| 2018/0174750 | A1* | 6/2018 | Yoon ..................... | H01G 4/248 |
| 2020/0075260 | A1* | 3/2020 | Yun ........................ | H01G 4/30 |

(Continued)

FOREIGN PATENT DOCUMENTS

| | | | | |
|---|---|---|---|---|
| JP | 2012-094819 A | | 5/2012 | |
| JP | 2022014532 A | * | 1/2022 | ............. C04B 35/01 |

(Continued)

*Primary Examiner* — Dion R. Ferguson
(74) *Attorney, Agent, or Firm* — Keating & Bennett, LLP

(57) ABSTRACT

A multilayer ceramic capacitor includes a multilayer body including a laminate chip and side gap portions. The laminate chip includes an inner layer portion in which dielectric layers and internal electrode layers are alternately laminated, and outer layer portions respectively on both sides of the inner layer portion in a lamination direction. Side gap portions are on both sides of the laminate chip in a width direction. The multilayer ceramic capacitor further includes external electrodes respectively on both sides of the multilayer body in a length direction. When a thickness of one of the outer layer portions is defined as T1, and a thickness of one of the side gap portions is defined as W1, W1 and T1 are about 20 μm or less, and about $0.1<|(W1-T1)|/T1<$ about $0.3$ is satisfied.

17 Claims, 10 Drawing Sheets

(56) References Cited

U.S. PATENT DOCUMENTS

| | | | | |
|---|---|---|---|---|
| 2020/0152390 A1* | 5/2020 | Yeon | ................ | H01G 4/12 |
| 2020/0152391 A1* | 5/2020 | Kang | ................ | H01G 4/12 |
| 2020/0312562 A1* | 10/2020 | Nishibayashi | ....... | H01G 4/2325 |
| 2021/0233713 A1* | 7/2021 | Nishimura | ............ | H01G 4/008 |
| 2022/0139631 A1* | 5/2022 | Yoshida | ................ | H01G 4/012 |
| | | | | 361/301.4 |

FOREIGN PATENT DOCUMENTS

| | | | | | |
|---|---|---|---|---|---|
| JP | 2022014533 A | * | 1/2022 | ............ | H01G 4/008 |
| KR | 20200009978 A | * | 1/2020 | | |
| KR | 20200054599 A | * | 5/2020 | | |
| KR | 20200104841 A | * | 9/2020 | | |
| WO | WO-2013074577 A1 | * | 5/2013 | ............ | H01G 4/012 |

\* cited by examiner

MULTILAYER CERAMIC CAPACITOR

CROSS REFERENCE TO RELATED APPLICATIONS

This application claims the benefit of priority to Japanese Patent Application No. 2020-183729 filed on Nov. 2, 2020. The entire contents of this application are hereby incorporated herein by reference.

BACKGROUND OF THE INVENTION

1. Field of the Invention

The present invention relates to a multilayer ceramic capacitor.

2. Description of the Related Art

Some multilayer ceramic capacitors are manufactured by the side gap portion retrofitting method (refer to Japanese Unexamined Patent Application, Publication No. 2012-94819). The side gap portion retrofitting method includes alternately laminating dielectric layers and internal electrode layers in a multilayer ceramic capacitor, providing outer layer portions 12 above and below in the lamination direction to manufacture a laminate chip, and providing side gap portions on both side surface of the laminate chip.

The side gap portion retrofitting method is suitable for miniaturization of multilayer ceramic capacitors, because it is relatively easy to make the side gap portions thin.

However, when the side gap portions are made thin, there is a tendency for cracks to easily occur in a ridge line portion and a corner portion.

The inventors of preferred embodiments of the present invention have conducted extensive studies, and have discovered that, when the thickness of the side gap portion and the thickness of the outer layer portion are in a predetermined relationship, it is possible to reduce or prevent cracks from occurring even if a multilayer ceramic capacitor is miniaturized.

SUMMARY OF THE INVENTION

Preferred embodiments of the present invention provide multilayer ceramic capacitors that are each able to reduce or prevent cracks from occurring while enabling miniaturization.

A preferred embodiment of the present invention provides a multilayer ceramic capacitor including a multilayer body including a laminate chip and side gap portions, the laminate chip including an inner layer portion in which dielectric layers and internal electrode layers are alternately laminated, and outer layer portions respectively provided on both sides of the inner layer portion in a lamination direction, the side gap portions respectively provided on both sides of the laminate chip in a width direction perpendicular or substantially perpendicular to the lamination direction, and external electrodes respectively provided on both sides of the multilayer body in a length direction intersecting the lamination direction and the width direction, wherein, when a thickness of one of the outer layer portions is defined as T1, and a thickness of one of the side gap portions is defined as W1, W1 and T1 are about 20 μm or less, and about $0.1 < |(W1-T1)|/T1 <$ about $0.3$ is satisfied.

According to preferred embodiments of the present invention, it is possible to provide multilayer ceramic capacitors that are each able to reduce or prevent cracks from occurring while enabling miniaturization.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described in detail with reference to the drawings.

Figure 1:
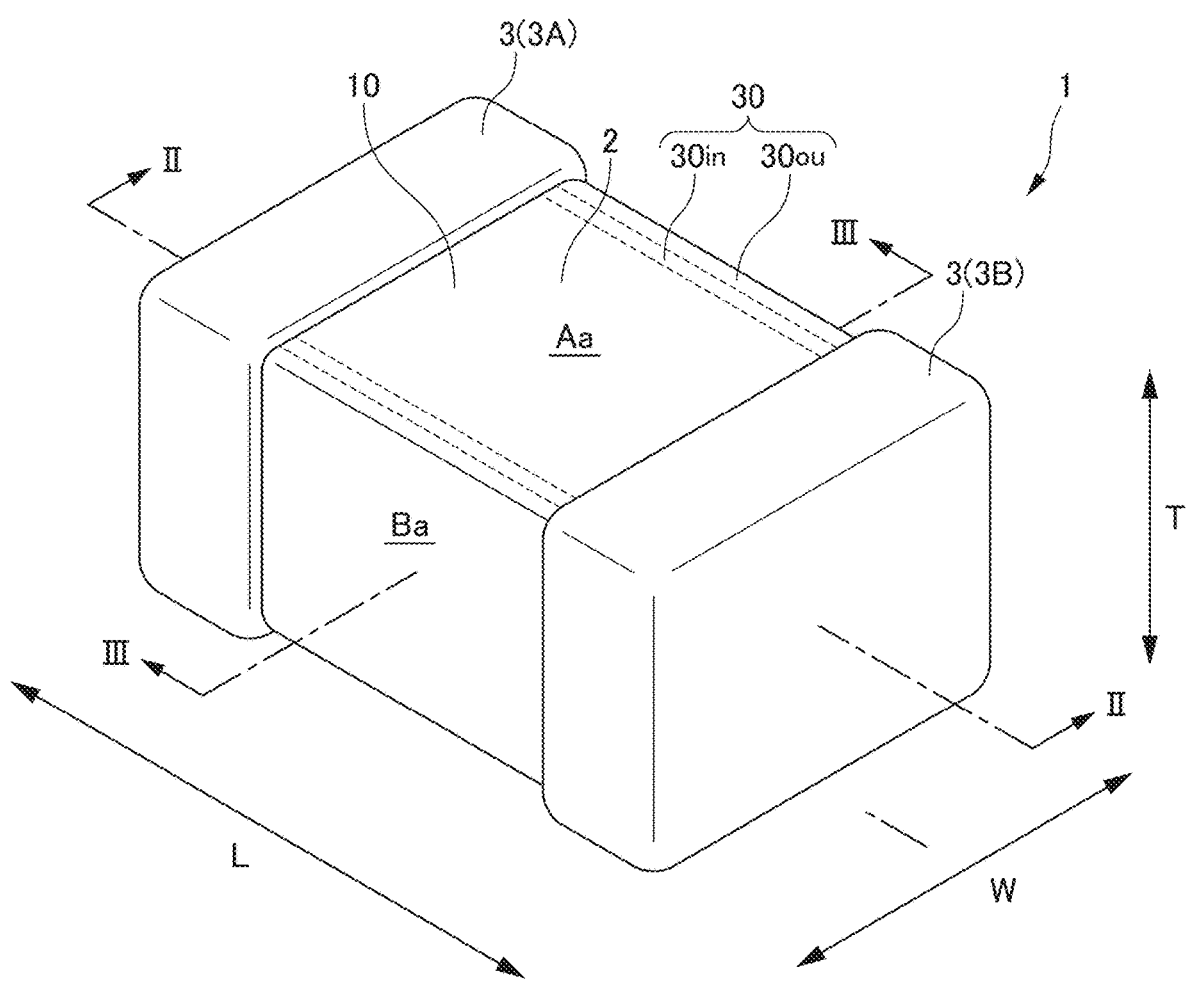
FIG. 1 is a schematic perspective view of a multilayer ceramic capacitor according to a preferred embodiment of the present invention.
Figure 2:
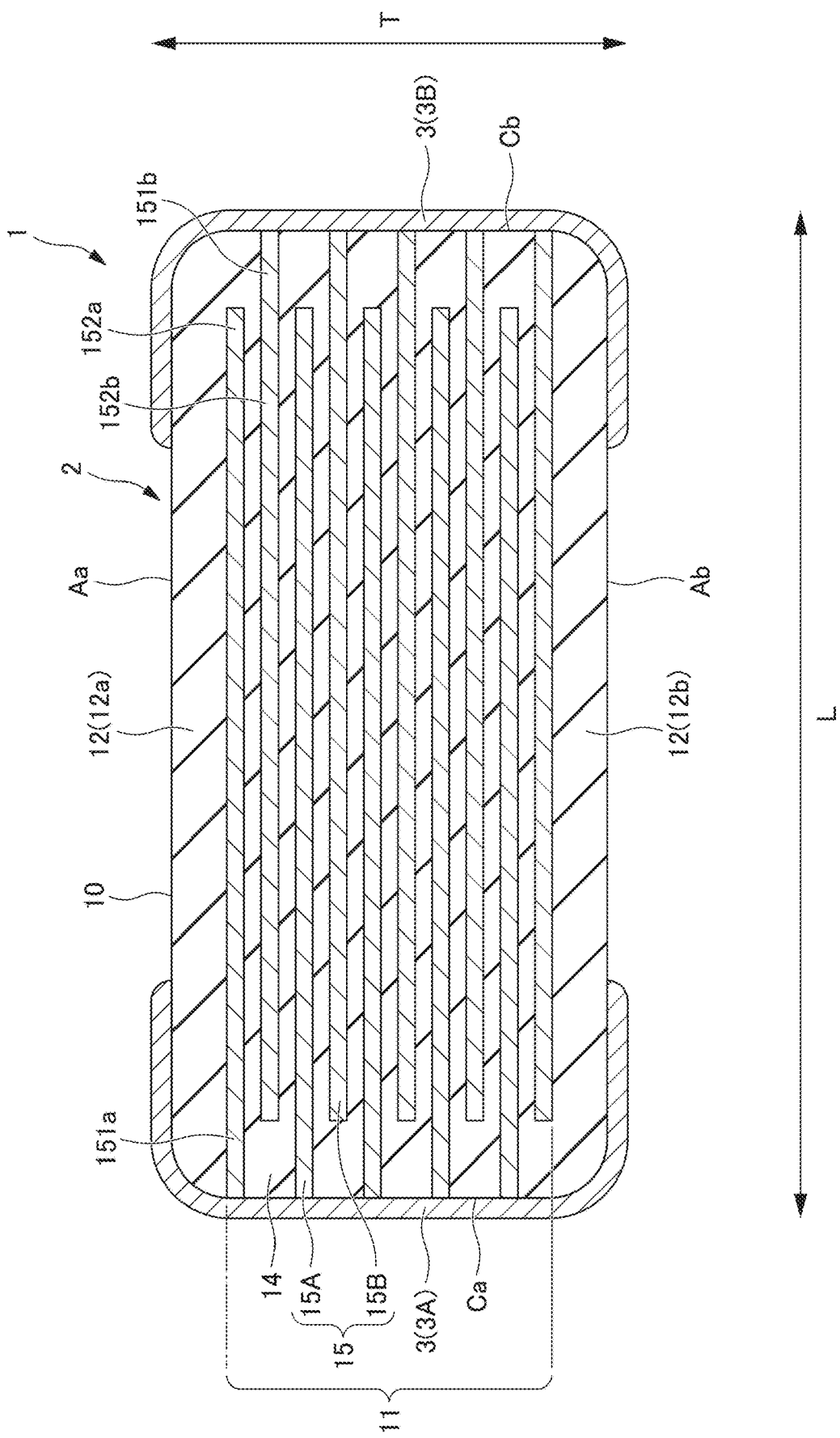
FIG. 2 is a cross-sectional view taken along the line II-II of the multilayer ceramic capacitor in FIG. 1.
Figure 3:
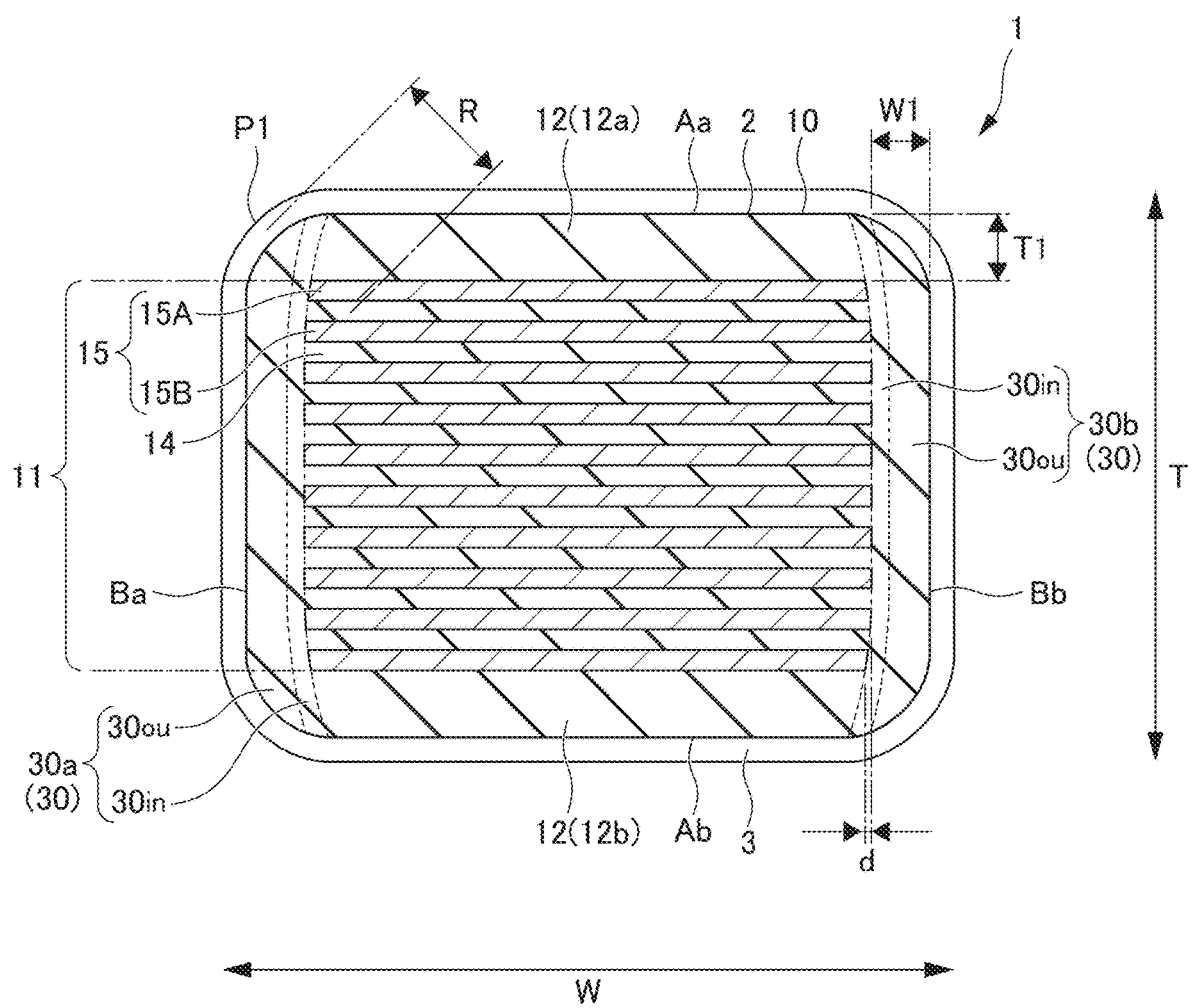
FIG. 3 is a cross-sectional view taken along the line III-III of the multilayer ceramic capacitor in FIG. 1.

Hereinafter, a multilayer ceramic capacitor 1 according to a preferred embodiment of the present invention will be described. FIG. 1 is a schematic perspective view of the multilayer ceramic capacitor 1 of the present preferred embodiment. FIG. 2 is a cross-sectional view taken along the line II-II of the multilayer ceramic capacitor 1 in FIG. 1. FIG. 3 is a cross-sectional view taken along the line III-III of the multilayer ceramic capacitor 1 in FIG. 1.

The multilayer ceramic capacitor 1 has a rectangular or substantially rectangular parallelepiped shape, and includes a multilayer body 2, and a pair of external electrodes 3 provided at both ends of the multilayer body 2. The multilayer body 2 includes an inner layer portion 11 including a plurality of sets of dielectric layers 14 and internal electrode layers 15.

In the following description, as terms representing the orientation of the multilayer ceramic capacitor 1, a direction in which the pair of external electrodes 3 is provided is defined as a length direction L. A direction in which the dielectric layers 14 and the internal electrode layers 15 are laminated (stacked) is defined as a lamination (stacking) direction T. A direction intersecting both the length direction L and the lamination direction T is defined as a width direction W. It should be noted that, in the present preferred embodiment, the width direction is perpendicular or substantially perpendicular to both the length direction L and the lamination direction T.

Figure 4:
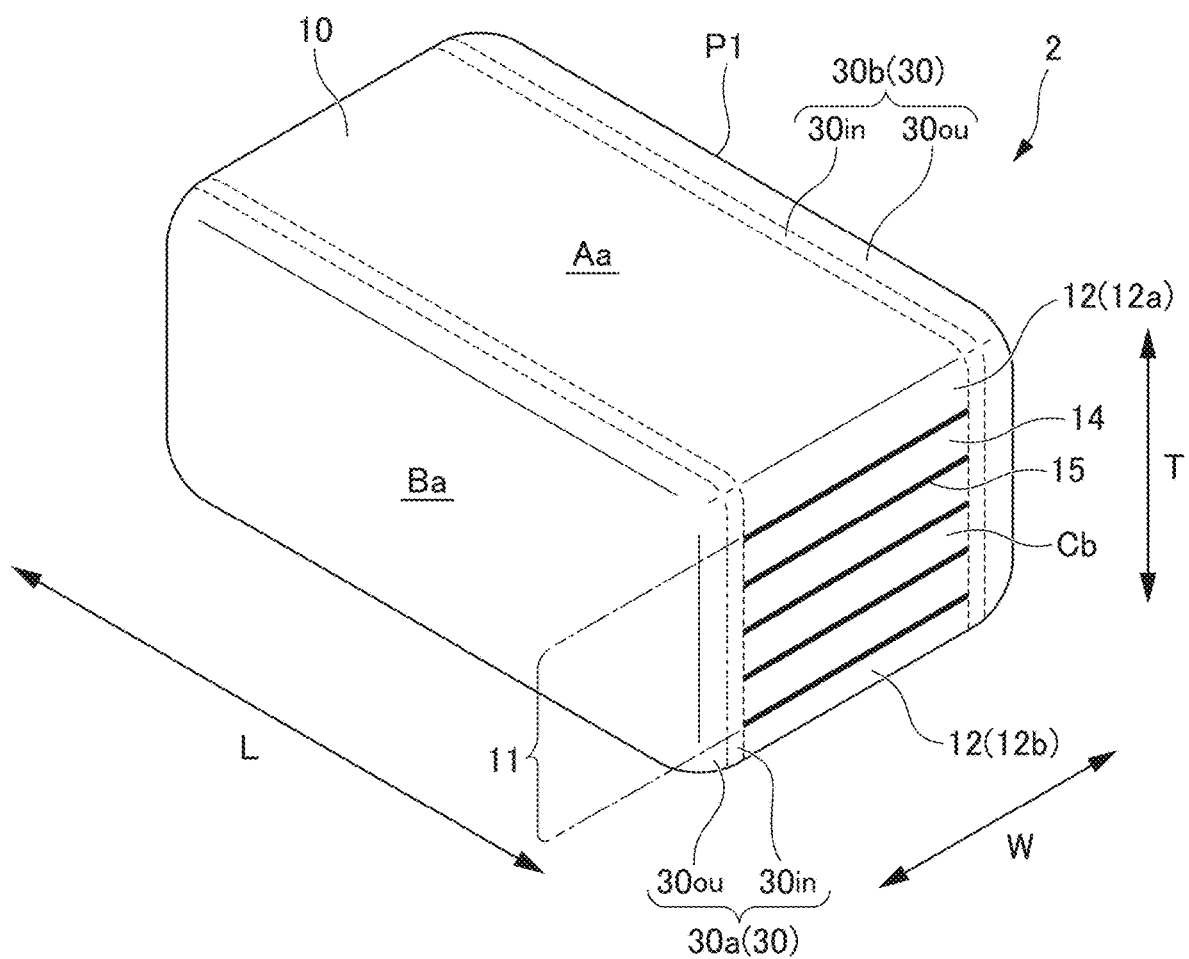
FIG. 4 is a schematic perspective view of a multilayer body.
Figure 5:
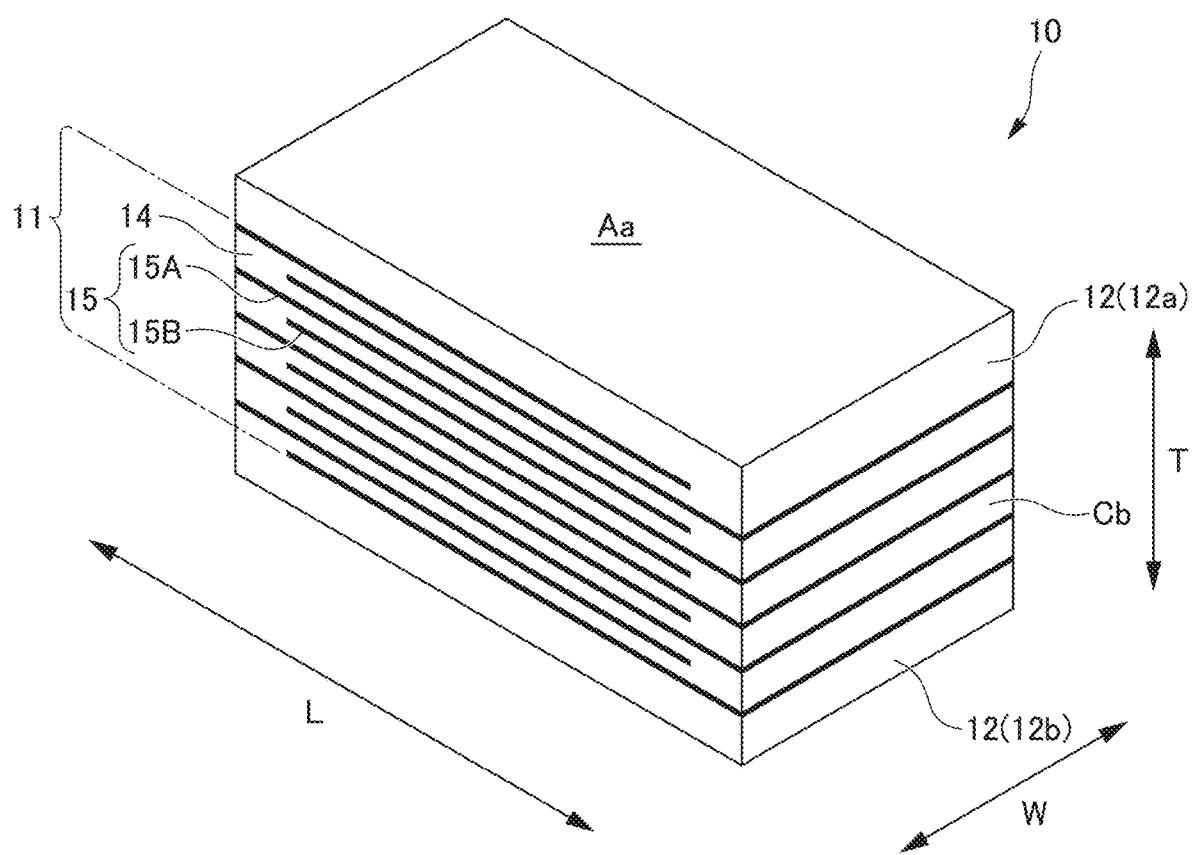
FIG. 5 is a schematic perspective view of a laminate chip.

FIG. 4 is a schematic perspective view of the multilayer body 2. The multilayer body 2 includes a laminate chip 10 and side gap portions 30. FIG. 5 is a schematic perspective view of the laminate chip 10.

In the following description, among the six outer surfaces of the multilayer body 2 shown in FIG. 4, a pair of outer surfaces opposing in the stacking direction T is defined as a first main surface Aa and a second main surface Ab, a pair of outer surfaces opposing in the width direction W is defined as a first side surface Ba and a second side surface Bb, and a pair of outer surfaces opposing in the length direction L is defined as a first end surface Ca and a second end surface Cb.

When it is not necessary to particularly distinguish between the first main surface Aa and the second main surface Ab from each other, they are collectively described as a main surface A. When it is not necessary to particularly distinguish between the first side surface Ba and the second side surface Bb from each other, they are collectively described as a side surface B. When it is not necessary to particularly distinguish between the first end surface Ca and the second end surface Cb from each other, they are collectively described as an end surface C.

Multilayer Body 2

The dimensions of the multilayer body 2 are not particularly limited. However, for example, it is preferable that the L dimension in the length direction is about 0.2 mm or more and about 10 mm or less, the W dimension in the width direction is about 0.1 mm or more and about 10 mm or less, and the T dimension in the lamination direction is about 0.1 mm or more and about 5 mm or less.

In the multilayer body 2, at least a ridge line portion P1 between the main surface A and the side surface B is chamfered and rounded. In the present preferred embodiment, R shown in FIG. 3 of the chamfered portion is, for example, about 23 µm to about 28 µm, and R has a relationship of R>T1 which is larger than the thickness T1 of an outer layer portion 12, which will be described later. Furthermore, there is no inflection point in the curve of the ridge line portion P1.

It should be noted that, for example, a diamond-like-carbon (DLC) layer or a $SiO_2$ layer is provided on the surface of the multilayer body 2. The main surface A, the side surface B, and the end surface C, which are the surfaces of the multilayer body 2, thus have high hardness and surface smoothness.

Laminate Chip 10

As shown in FIG. 5, the laminate chip 10 includes the inner layer portion 11, an upper outer layer portion 12a provided in the vicinity of the first main surface Aa of the inner layer portion 11, and a lower outer layer portion 12b provided in the vicinity of the second main surface Ab of the inner layer portion 11. When it is not necessary to particularly distinguish between the upper outer layer portion 12a and the lower outer layer portion 12b, they are collectively referred to as an outer layer portion 12.

Inner Layer Portion 11

The inner layer portion 11 includes a plurality of sets of dielectric layers 14 and internal electrode layers 15 which are alternately laminated along the lamination direction T.

Dielectric Layer 14

Dielectric layers 14 each have a thickness of, for example, about 0.5 µm or less. The dielectric layers 14 are each made of a ceramic material. As the ceramic material, for example, a dielectric ceramic including $BaTiO_3$ as a main component is used. Furthermore, as the ceramic material, those obtained by adding at least one sub-component such as, for example, Mn compound, Fe compound, Cr compound, Co compound, and Ni compound to these main components may be used. The number of dielectric layers 14 of the laminate chip 10 is preferably, for example, 15 or more and 700 or less in total, including the upper outer layer portion 12a and the lower outer layer portion 12b.

Internal Electrode Layer 15

The internal electrode layers 15 each include a plurality of first internal electrode layers 15A and a plurality of second internal electrode layers 15B. The first internal electrode layers 15A and the second internal electrode layers 15B are alternately provided. When it is not necessary to particularly distinguish between the first internal electrode layer 15A and the second internal electrode layer 15B, they will be collectively referred to as an internal electrode layer 15.

The first internal electrode layer 15A includes a first opposing portion 152a facing the second internal electrode layer 15B, and a first lead-out portion 151a extending from the first opposing portion 152a toward the first end surface Ca. The end portion of the first lead-out portion 151a is exposed at the first end surface Ca and electrically connected to the first external electrode 3A described later.

The second internal electrode layer 15B includes a second opposing portion 152b facing the first internal electrode layer 15A, and a second lead-out portion 151b extending from the second opposing portion 152b to the second end surface Cb. The end portion of the second lead-out portion 151b is electrically connected to the second external electrode 3B to be described later.

According to the internal electrode layer 15 described above, a charge is accumulated in the first opposing portion 152a of the first internal electrode layer 15A and the second opposing portion 152b of the second internal electrode layer 15B, such that the characteristics of the capacitor are provided.

As shown in FIG. 3, in the WT cross section which is a cross section in the width direction W and the lamination direction T passing through the center of the multilayer body 2, a deviation d in the lamination direction T between the ends in the width direction W of the two first internal electrode layer 15A and the second internal electrode layer 15B adjacent vertically in the lamination direction T is, for example, about 0.5 µm or less. That is, the end portions in the width direction W of the first internal electrode layers 15A and the second internal electrode layers 15B adjacent vertically in the lamination direction T are at the same position or substantially at the same position in the width direction W, and the positions of the end portions are aligned in the lamination direction T.

The internal electrode layer 15 is preferably made of, for example, a metallic material such as Ni, Cu, Ag, Pd, Ag—Pd alloy, Au, or the like. The thickness of the internal electrode layer 15 is preferably, for example, from at least about 0.5 µm to about 2.0 µm, for example. The number of the internal electrode layers 15 is preferably, for example, 15 or more and 200 or less in total, including the first internal electrode layers 15A and the second internal electrode layers 15B.

Outer Layer Portion 12

The upper outer layer portion 12a and the lower outer layer portion 12b are made of the same dielectric ceramic material as the dielectric layer 14 of the inner layer portion 11, for example, a dielectric ceramic material including $BaTiO_3$ as a main component.

Side Gap Portion 30

The side gap portions 30 each include a first side gap portion 30a provided on the first side surface Ba of the laminate chip 10, and a second side gap portion 30b provided on the second side surface Bb of the laminate chip 10.

When it is not necessary to particularly distinguish between the first side gap portion 30a and the second side gap portion 30b, they will be collectively referred to as a side gap portion 30.

The side gap portions 30 cover the end portions in the width direction W of the internal electrode layers 15 exposed at both side surfaces of the laminate chip 10 along the end portions. The side gap portions 30 are each made of, for example, a dielectric ceramic material including $BaTiO_3$ as a main component similar to the dielectric layers 14, and further include, for example, Mg (magnesium) as a sintering aid. Mg migrates toward the internal electrode layers 15 during firing of the side gap portions 30, and thus segregates on the side in contact with the internal electrode layers 15 in the side gap portion 30. Furthermore, an interface is present between the laminate chip 10 and the side gap portion 30.

In the present preferred embodiment, the side gap portion 30 includes a two-layer structure of an outer side gap portion 30ou located outside and an inner side gap portion 30in located in the vicinity of the internal electrode layer 15. Furthermore, the outer side gap portion 30ou is preferably thicker than the outer layer portion 12. However, the present invention is not limited thereto, and the side gap portion 30 may include a single-layer structure.

The molar ratio of Si to Ti included in the outer side gap portion 30ou of the present preferred embodiment is larger than the molar ratio of Si to Ti included in the outer layer portion 12.

Furthermore, the content of Si is larger in the outer side gap portion 30ou than in the inner side gap portion 30in.

As described above, when the molar ratio of Si to Ti included in the outer side gap portion 30ou is larger than the molar ratio of Si to Ti included in the outer layer portion 12, or when the content of Si is larger in the outer side gap portion 30ou than in the inner side gap portion 30in, it is possible to improve the strength of the outer layer portion 12.

Therefore, cracks are less likely to occur in the ridge line portion P1 and the side gap portion 30. Therefore, it is possible to reduce or prevent moisture infiltration from cracks, such that it is possible to ensure the insulating property of the multilayer ceramic capacitor 1. As a result, it is possible to provide the multilayer ceramic capacitor 1 with improved reliability.

Furthermore, since the interface is present between the outer side gap portion 30ou and the inner side gap portion 30in, it is possible to reduce the stress acting on the multilayer ceramic capacitor 1 by this interface.

Therefore, with such a configuration, cracks are less likely to occur in the ridge line portion P1 and the side gap portion 30, and it is possible to reduce or prevent moisture infiltration from cracks, such that it is possible to ensure the insulating property of the multilayer ceramic capacitor 1. As a result, it is possible to provide the multilayer ceramic capacitor 1 with improved reliability.

In the present preferred embodiment, the thickness W1 of the side gap portion 30 and the thickness T1 of the outer layer portion 12 are, for example, about 20 μm or less. Furthermore, W1<T1 is preferable.

When W1<T1, since a force of the side gap portion 30 pulling the outer layer portion 12 is reduced, it is possible to reduce or prevent cracks from occurring in the ridge line portion P1.

In addition, about 0.1<|(W1-T1)|/T1<about 0.3 is satisfied.

That is, when the thickness W of the side gap portion 30 is larger than the thickness T of the outer layer portion 12, about 1.1<W1/T1<about 1.3 is satisfied.

When the thickness W of the side gap portion 30 is smaller than the thickness T of the outer layer portion 12, about 0.7<W1/T1<about 0.9 is established.

Furthermore, about 0.8<W1/T1<about 1.3 is preferable.

Figure 6:
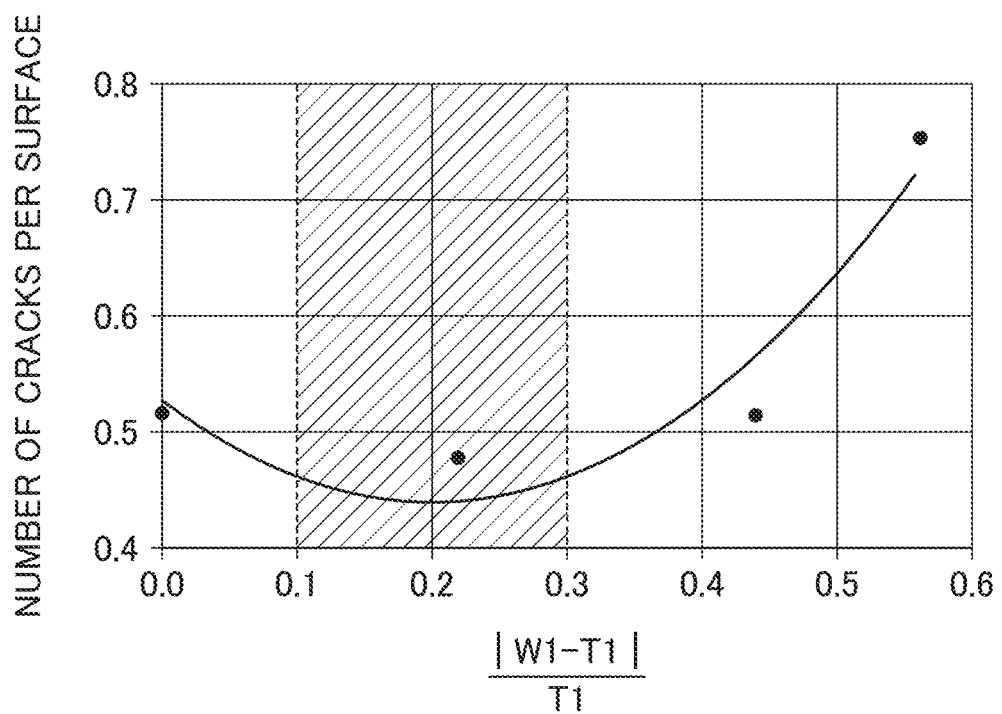
FIG. 6 is a graph with W1/T1 on the horizontal axis and the number of cracks on the vertical axis.

FIG. 6 provides a graph with |(W1-T1)|/T1 on the horizontal axis and the number of cracks per surface on the vertical axis. FIG. 6 shows the case of W1<T1. However, as shown, it was discovered that the number of cracks is smaller in the range of about 0.1<|(W1-T1)|/T1<about 0.3 than in the other ranges.

The number of cracks per surface is obtained by counting the cracks occurring on the four surfaces of the first main surface Aa, the second main surface Ab, the first side surface Ba, and the second side surface Bb, and dividing the resulting number of the cracks by 4.

Furthermore, as described above, the chamfered portion R of the ridge line portion P1 between the side gap portion 30 and the main surface A is, for example, about 23 μm to about 28 μm, and has a relationship of R>T1 in which the chamfered portion R is larger than the thickness T1 of the outer layer portion 12. Furthermore, there is no inflection point in the curve of the ridge line portion P1.

When R>T1, the outer side gap portion 30ou which is likely to be densified is separated from the outer layer portion 12. Therefore, the force of the side gap portion 30 pulling a portion in the vicinity of the outer layer is weakened. As a result, the compressive stress of the outer layer portion 12 increases, and the strength of the outer layer portion 12 can be improved, such that the occurrence of cracks in the outer layer portion 12 and the ridge line portion P1 are reduced or prevented.

The external electrode 3 is provided on the first end surface Ca of the multilayer body 2. The external electrode 3 covers not only the end surface C, but also covers portions of the main surface A and the side surface B which are in the vicinity of the end surface C.

As described above, the end portions of the first lead-out portions 151a of the first internal electrode layers 15A are each exposed at the first end surface Ca and electrically connected to the first external electrode layer 3A. Furthermore, the end portions of the second lead-out portions 151b of the second internal electrode layers 15B are each exposed at the second end surface Cb, and electrically connected to the second external electrode layer 3B. Thus, a plurality of capacitor elements are electrically connected in parallel between the first external electrode 3A and the second external electrode 3B.

Manufacturing Process

Figure 7:
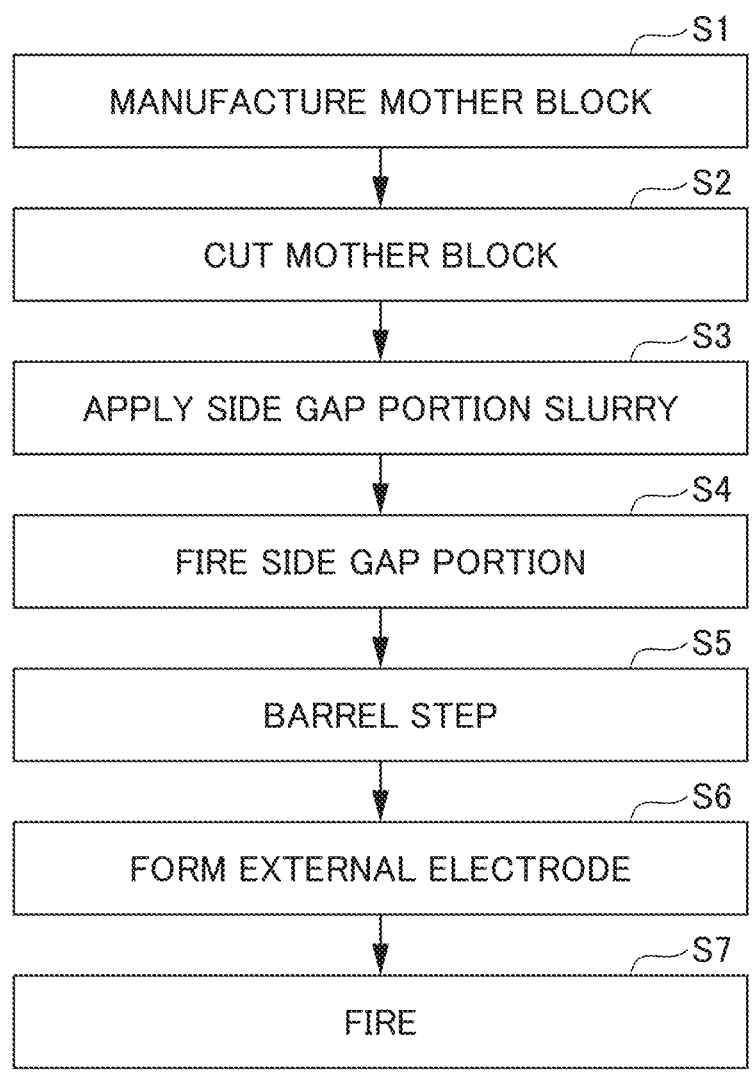
FIG. 7 is a flowchart showing a method of manufacturing a multilayer ceramic capacitor according to a preferred embodiment of the present invention.
Figure 8:
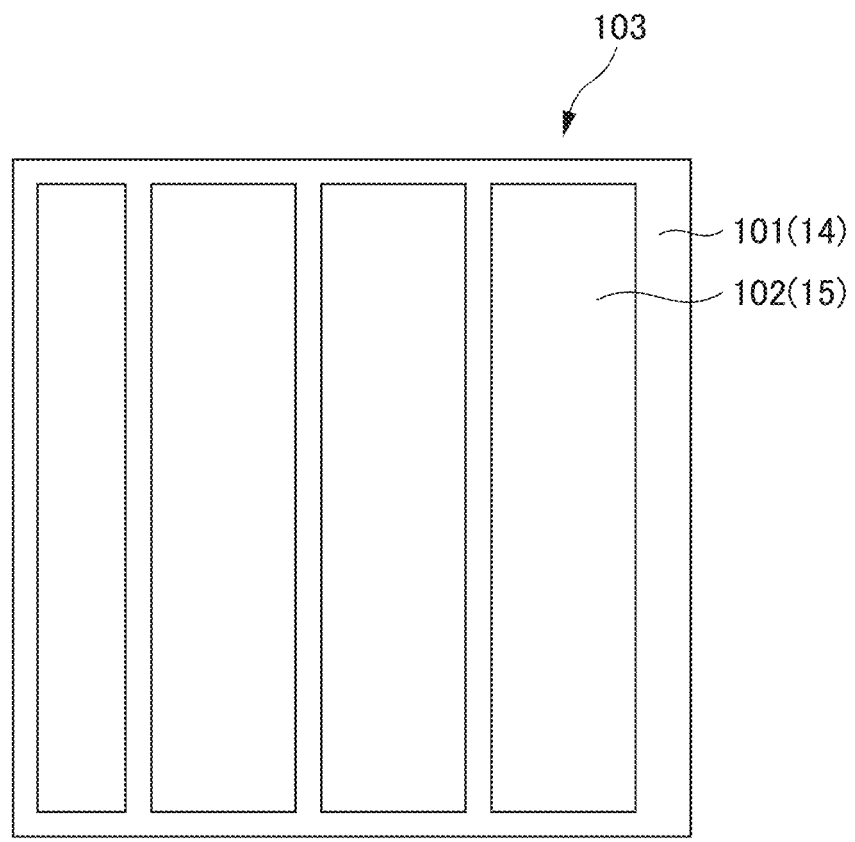
FIG. 8 is a schematic plan view of a material sheet.
Figure 9:
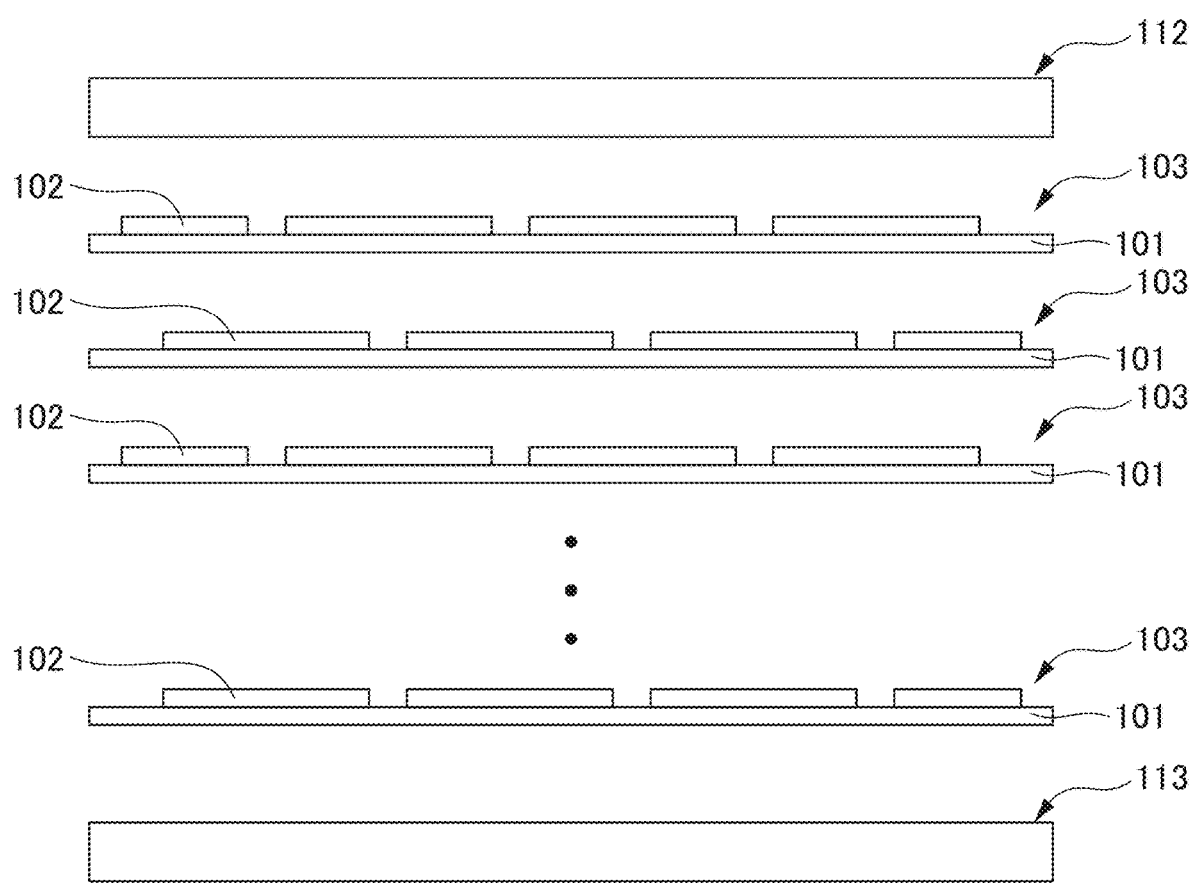
FIG. 9 is a schematic view showing a laminated state of material sheets.
Figure 10:
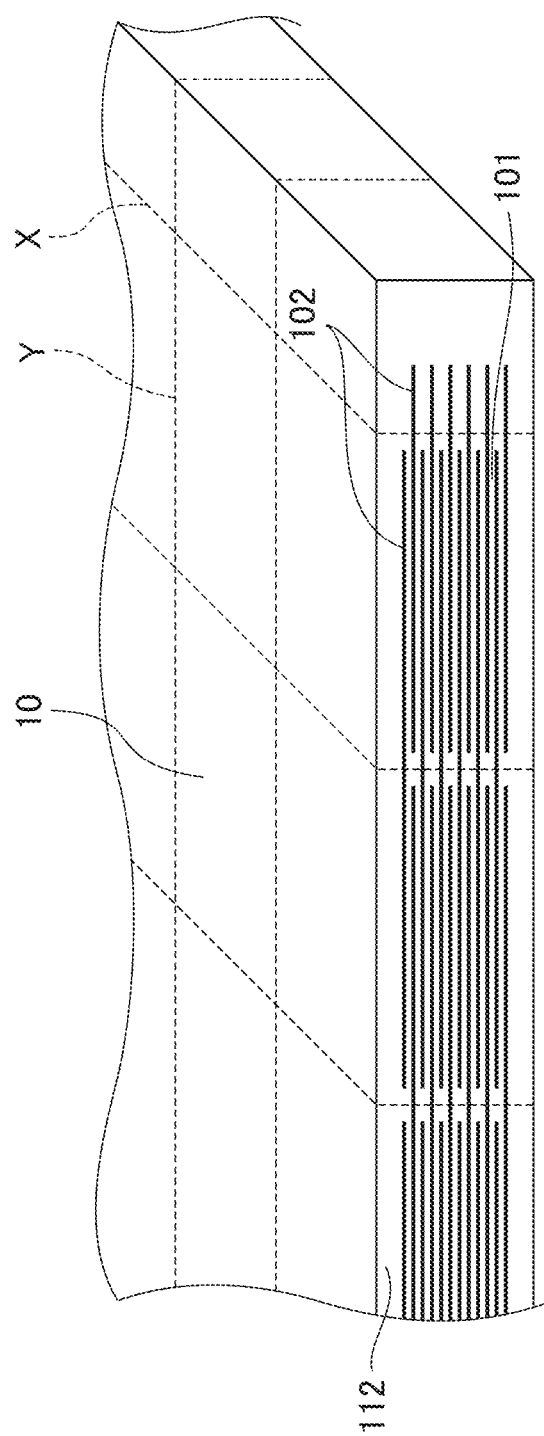
FIG. 10 is a schematic perspective view of a mother block.

FIG. 7 is a flowchart showing a non-limiting example of a method of manufacturing the multilayer ceramic capacitor 1. FIG. 8 is a schematic plan view of the material sheet 103. FIG. 9 is a schematic view showing laminated states of the material sheets 103. FIG. 10 is a schematic perspective view of the mother block 110.

Mother Block Manufacturing Step S1

First, a ceramic slurry including a ceramic powder, a binder and a solvent is prepared. The ceramic slurry is formed into a sheet shape using, for example, a die coater, a gravure coater, a micro gravure coater, or the like on the carrier film, such that a multilayer ceramic green sheet 101 is manufactured.

Subsequently, a conductive paste 102 is printed on the multilayer ceramic green sheet 101 so as to include a strip-shaped pattern by, for example, screen printing, ink jet printing, gravure printing, or the like.

Thus, as shown in FIG. 8, a material sheet 103 on which the conductive pattern 102 of the internal electrode layer 15 is printed on the surface of the multilayer ceramic green sheet 101 of the dielectric layer 14 is prepared.

Subsequently, as shown in FIG. 9, a plurality of material sheets 103 are laminated. More specifically, the plurality of material sheets 103 are laminated so that the strip-shaped conductive patterns 102 are oriented in the same direction and are a state shifted by half pitch in the width direction between adjacent material sheets 103. Furthermore, an upper outer layer portion ceramic green sheet 112 of the upper outer layer portion 12a is laminated on one side of the plurality of laminated material sheets 103, and a lower outer layer portion ceramic green sheet 113 of the lower outer layer portion 12b is laminated on the other side of the plurality of laminated material sheets 103.

Subsequently, the upper outer layer portion ceramic green sheet 112, the plurality of laminated material sheets 103, and the lower outer layer portion ceramic green sheet 113 are subjected to thermocompression bonding. As a result, a mother block 110 shown in FIG. 10 is formed.

Mother Block Cutting Step S2

Then, as shown in FIG. 10, the mother block 110 is cut along the cutting line X and the cutting line Y intersecting the cutting line X corresponding to the dimensions of the laminate chip 10. As a result, a plurality of laminate chips 10 shown in FIG. 5 are manufactured. In the present preferred embodiment, the cutting line Y is perpendicular or substantially perpendicular to the cutting line X.

Ceramic Green Sheet Affixing Step S3 for Side Gap Portion

Next, a ceramic slurry to which Mg was added as a sintering aid to the dielectric powder, which is similar to or the same as that of the multilayer ceramic green sheet 101, is prepared. Then, the ceramic slurry is applied on a resin film, and dried to manufacture a side gap portion ceramic green sheet.

Then, the side gap portion ceramic green sheet is affixed on the side portion where the internal electrode layers 15 of the laminate chip 10 are exposed, such that the layer defining and functioning as the side gap portion 30 is formed.

Side Gap Portion Firing Step S4

The laminate chip 10 on which the layer defining and functioning as the side gap portion 30 is formed is subjected to degreasing process in a nitrogen atmosphere under a predetermined condition, then fired at a predetermined temperature in a nitrogen-hydrogen-steam mixed atmosphere, and sintered to form the multilayer body 2.

Here, Mg of the side gap portion 30 during sintering migrates toward the internal electrode layers 15.

Thus, Mg of the side gap portion 30 is segregated on a side where the internal electrode layers are located after sintering. Furthermore, the dielectric layer 14 and the side gap portion 30 are made of the same or substantially the same material. However, since the side gap portion 30 is affixed to the laminate chip 10 including the dielectric layer 14, there is an interface between the side gap portion 30 and the laminate chip 10 even after sintering.

Barrel Step S5

Next, in a barrel step S5, barrel polishing is performed on the multilayer body 2. As a result, as shown in FIG. 5, R is given to the ridge line portion P1 of the multilayer body 2.

External Electrode Of Step S6

Next, the external electrode 3 is formed at both ends of the multilayer body 2.

Firing Step S7

Then, the resultant body is heated for a predetermined time in a nitrogen atmosphere at a set firing temperature. Thus, the external electrode 3 is fired to the multilayer body 2 such that the multilayer ceramic capacitor 1 is manufactured.

As described above, the present preferred embodiment has the following advantageous effects.

The molar ratio of Si to Ti included in the outer side gap portion 30ou is larger than the molar ratio of Si to Ti included in the outer layer portion 12, or the content of Si is larger in the outer side gap portion 30ou than that in the inner side gap portion 30in. As a result, it is possible to improve the strength of the outer layer portion 12.

Therefore, cracks are less likely to occur in the ridge line portion P1 and the side gap portion 30, and it is possible to reduce or prevent moisture infiltration from the cracks, such that it is possible to ensure the insulation of the multilayer ceramic capacitor 1. As a result, it is possible to provide the multilayer ceramic capacitor 1 with improved reliability.

Furthermore, since the interface is present between the outer side gap portion 30ou and the inner side gap portion 30in, it is possible to reduce the stress acting on the multilayer ceramic capacitor 1 by this interface.

Therefore, with such a configuration, cracks are less likely to occur in the ridge line portion P1 and the side gap portion 30, and it is possible to reduce or prevent moisture infiltration from cracks, such that it is possible to ensure the insulating property of the multilayer ceramic capacitor 1. As a result, it is possible to provide the multilayer ceramic capacitor 1 with improved reliability.

Furthermore, when W1<T1, since a force of the side gap portion 30 pulling the outer layer portion 12 is reduced, it is possible to reduce or prevent cracks from occurring in the ridge line portion P1.

Furthermore, since about $0.1<|(W1-T1)|/T<$ about $0.3$ is satisfied, the advantageous effects of maximizing the volume of the inner layer portion and minimizing the number of cracks are achieved at the same time.

When about $0.8<W1/T1<$ about $1.3$ is satisfied, as an advantageous effect, the outer layer can be prevented from peeling off because sufficient pressure is applied at the time of multilayer.

Furthermore, the chamfered portion R of the ridge line portion P1 between the side gap portion 30 and the main surface A is larger than the thickness T1 of the outer layer portion 12.

As described above, when R>T1, the outer side gap portion 30ou which is likely to be densified is separated from the outer layer portion 12. Therefore, the force of the side gap portion 30 pulling a portion in the vicinity of the outer layer is weakened. As a result, the compressive stress of the outer layer portion 12 increases, and the strength of the outer layer portion 12 can be improved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer ceramic capacitor comprising:
   a multilayer body including:
      a laminate chip and side gap portions, the laminate chip including an inner layer portion in which dielectric layers and internal electrode layers are alternately laminated, and outer layer portions respectively on both sides of the inner layer portion in a lamination direction, and the side gap portions respectively on both sides of the laminate chip in a width direction perpendicular or substantially perpendicular to the lamination direction; and external electrodes on both sides of the multilayer body in a length direction intersecting the lamination direction and the width direction; wherein when a thickness of one of the outer layer portions is defined as T1, and a thickness of one of the side gap portions is defined as W1, W1 and T1 are about 20 μm or less, and about $0.1 < |(W1-T1)|/T1 <$ about $0.3$ is satisfied;

the side gap portions sandwich and cover the outer layer portions in the width direction, and cover the internal electrode layers along end portions of the internal electrode layers in the width direction; and an interface is provided between the side gap portions and the outer layer portions.

2. The multilayer ceramic capacitor according to claim 1, wherein about $0.8 < W1/T1 <$ about $1.3$ is satisfied.

3. The multilayer ceramic capacitor according to claim 1, wherein $W1 < T1$ is satisfied.

4. The multilayer ceramic capacitor according to claim 1, wherein a radius of curvature R of a ridge line portion between side surfaces on both sides in the width direction of the multilayer body and main surfaces on both sides in the lamination direction of the multilayer body, in a cross-section including the width direction and the lamination direction at a middle portion in the length direction of the multilayer body, has a relationship of $R > T1$.

5. The multilayer ceramic capacitor according to claim 4, wherein a curve connecting the side surface and the main surface including the ridge line portion in the cross-section has no inflection point.

6. The multilayer ceramic capacitor according to claim 1, wherein a surface of the multilayer body includes a diamond-like-carbon (DLC) layer or a $SiO_2$ layer.

7. The multilayer ceramic capacitor according to claim 1, wherein a dimension of the multilayer body in the length direction is about 0.2 mm or more and about 10 mm or less, a dimension of the multilayer body in the width direction is about 0.1 mm or more and about 10 mm or less, and a dimension of the multilayer body in the lamination direction is about 0.1 mm or more and about 5 mm or less.

8. The multilayer ceramic capacitor according to claim 4, wherein R is about 23 μm to about 28 μm.

9. The multilayer ceramic capacitor according to claim 1, wherein each of the dielectric layers has a thickness of about 0.5 μm or less.

10. The multilayer ceramic capacitor according to claim 1, wherein each of the dielectric layers includes $BaTiO_3$ as a main component.

11. The multilayer ceramic capacitor according to claim 10, wherein each of the dielectric layers further includes at least one of an Mn compound, a Fe compound, a Co compound, or a Ni compound as a sub-component.

12. The multilayer ceramic capacitor according to claim 1, wherein a number of the dielectric layers is 15 or more and 700 or less.

13. The multilayer ceramic capacitor according to claim 1, wherein each of the internal electrode layers includes at least one of Ni, Cu, Ag, Pd, or Ag-Pd alloy.

14. The multilayer ceramic capacitor according to claim 1, wherein each of the internal electrode layers has a thickness of about 0.5 μm to about 2.0 μm.

15. The multilayer ceramic capacitor according to claim 1, wherein each of the side gap portions include $BaTiO_3$ as a main component.

16. The multilayer ceramic capacitor according to claim 15, wherein each of side gap portions further includes Mg.

17. The multilayer ceramic capacitor according to claim 1, wherein the side gap portions include Si, and a content of the Si is larger in a portion of the side gap portions that is farther from the inner layer portion in the width direction than in a portion of the side gap portions that is closer to the inner layer portion in the width direction.

* * * * *